USO10107364B2

(12) United States Patent
Lee et al.

(10) Patent No.: US 10,107,364 B2
(45) Date of Patent: Oct. 23, 2018

(54) PLANETARY GEAR TRAIN OF AUTOMATIC TRANSMISSION FOR VEHICLE

(71) Applicant: Hyundai Motor Company, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 27 days.

(21) Appl. No.: 15/367,022

(22) Filed: Dec. 1, 2016

(65) Prior Publication Data

US 2017/0219059 A1    Aug. 3, 2017

(30) Foreign Application Priority Data

Feb. 3, 2016 (KR) .......................... 10-2016-0013662

(51) Int. Cl.
*F16H 3/66* (2006.01)
(52) U.S. Cl.
CPC ....... *F16H 3/66* (2013.01); *F16H 2200/0065* (2013.01); *F16H 2200/2012* (2013.01); *F16H 2200/2046* (2013.01)
(58) Field of Classification Search
None
See application file for complete search history.

(56) References Cited

U.S. PATENT DOCUMENTS

| 6,984,187 | B2* | 1/2006 | Biermann | F16H 3/66 475/215 |
| 9,777,804 | B2* | 10/2017 | Lee | F16H 3/66 |
| 9,784,340 | B2* | 10/2017 | Janson | F16H 3/66 |
| 2004/0147358 | A1* | 7/2004 | Biermann | F16H 3/66 475/275 |
| 2014/0371023 | A1* | 12/2014 | Janson | F16H 3/66 475/275 |
| 2017/0219055 | A1* | 8/2017 | Lee | F16H 3/66 |
| 2017/0219056 | A1* | 8/2017 | Lee | F16H 3/66 |
| 2017/0241519 | A1* | 8/2017 | Kim | F16H 3/666 |

FOREIGN PATENT DOCUMENTS

| JP | 2014-092276 A | 5/2014 |
| KR | 10-2005-0045598 A | 5/2005 |
| KR | 10-2011-0131817 A | 12/2011 |
| KR | 10-2012-0022267 A | 3/2012 |

\* cited by examiner

*Primary Examiner* — Colby M Hansen
(74) *Attorney, Agent, or Firm* — Morgan, Lewis & Bockius LLP

(57) ABSTRACT

A planetary gear train of an automatic transmission for a vehicle may include a first planetary gear set, a second planetary gear set, a third planetary gear set, a fourth planetary gear set, an input shaft mounted with the first, second, and third planetary gear sets at an external circumference of the input shaft, an output shaft disposed in parallel with the input shaft and mounted with the fourth planetary gear set on an external circumference of the output shaft, a first shaft directly connected with the input shaft, a second shaft, a third shaft, a fourth shaft, a fifth shaft, a sixth shaft, a seventh shaft, an eighth shaft directly connected with the output shaft, and selectively gear-meshed with the fifth shaft, and a ninth shaft.

25 Claims, 9 Drawing Sheets

FIG. 2

| Shift-stage | Control element | | | | | | Gear ratio | Step ratio | Remark |
|---|---|---|---|---|---|---|---|---|---|
| | C1 | C2 | C3 | B1 | B2 | B3 | | | |
| D1 | | | ● | | ● | ● | 4.582 | - | Gear ratio span : 8.501 |
| D2 | | ● | ● | | | ● | 2.974 | 1.541 | |
| D3 | | ● | | | ● | ● | 2.104 | 1.413 | |
| D4 | ● | | | | ● | ● | 1.723 | 1.221 | |
| D5 | ● | ● | | | ● | | 1.35 | 1.276 | |
| D6 | ● | ● | ● | | | | 1.05 | 1.286 | |
| D7 | ● | | ● | | ● | | 0.883 | 1.189 | Ratio of REV vs D1 : 0.85 |
| D8 | ● | | ● | ● | | | 0.683 | 1.293 | |
| D9 | ● | | | ● | ● | | 0.539 | 1.267 | |
| REV | | | | ● | ● | ● | -3.893 | - | |

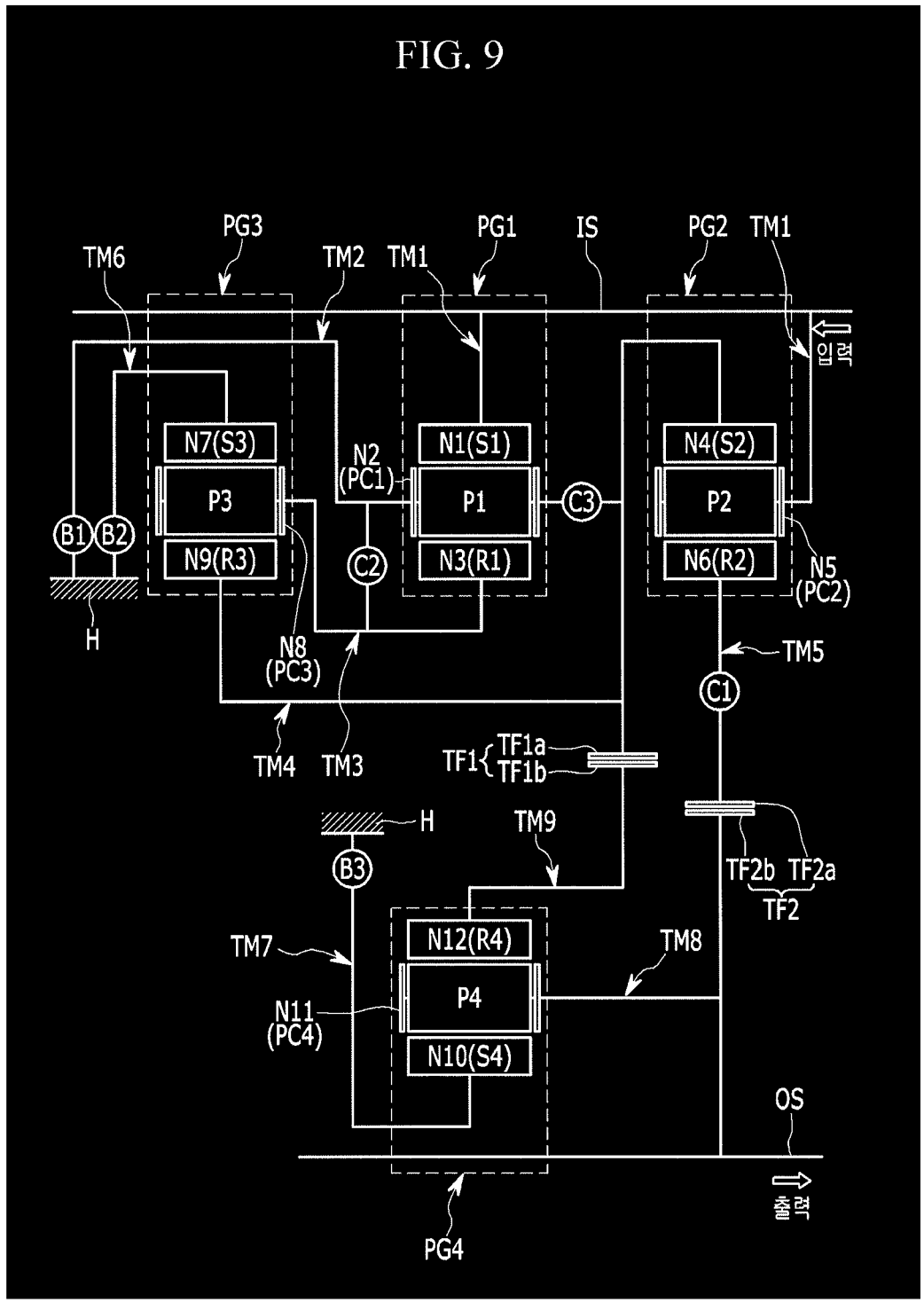

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0013662, filed Feb. 3, 2016, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition in enhancing fuel consumption of a vehicle.

In this sense, research on an automatic transmission has been performed to simultaneously provide better drivability and fuel consumption by achieving more shift stages.

However, in order to achieve more shift stages for an automatic transmission, the number of parts is typically increased, which may deteriorate installability and/or power flow efficiency and may increase production cost, and weight.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements has been attempted. However, such an arrangement is not widely applicable, and using dog clutches may easily deteriorate shift-feel.

In addition, a recent eight-speed automatic transmission typically shows a gear ratio span in a level of 6.5 to 7.5, which requires improvement for better fuel consumption.

Thus, shortening a length of an automatic transmission without deteriorating performance will be beneficial.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of realizing at least nine forward speeds and at least one reverse speed by a combination of four planetary gear sets, two external gears and six control elements, thereby providing improvement of power delivery performance and fuel consumption and improving installability by reducing a length thereof.

In addition, various aspects of the present invention are directed to providing a planetary gear train of an automatic transmission for a vehicle having a wide available range of varying gear teeth of transfer gears enabling easy obtaining of optimum gear ratios for respective vehicles, thereby improving power delivery performance and fuel consumption.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, an input shaft mounted with the first, second, and third planetary gear sets at an external circumference of the input shaft, an output shaft disposed in parallel with the input shaft and mounted with the fourth planetary gear set on an external circumference of the output shaft, a first shaft connecting the first rotation element and the fifth rotation element and directly connected with the input shaft, a second shaft connected with the second rotation element, a third shaft interconnecting the third rotation element and the eighth rotation element, a fourth shaft interconnecting the fourth rotation element and the ninth rotation element, a fifth shaft connected with the sixth rotation element, a sixth shaft connected with the seventh rotation element, a seventh shaft connected with the tenth rotation element, an eighth shaft connected with the eleventh rotation element, directly connected with the output shaft, and selectively gear-meshed with the fifth shaft, and a ninth shaft connected with the twelfth rotation element.

The second shaft may be selectively connectable with at least one of the input shaft and a transmission housing, the fourth shaft may be selectively connectable with the second shaft, and the sixth shaft may be selectively connectable with the transmission housing.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third planet carrier as the eighth rotation element, and a third ring gear as the ninth rotation element, and the fourth planetary gear set may include a fourth sun gear as the tenth rotation element, a fourth planet carrier as the eleventh rotation element, and a fourth ring gear as the twelfth rotation element.

The first, second, and third planetary gear sets may be disposed on the input shaft in an order of first and third planetary gear sets from an engine side, and the second planetary gear set may be disposed on an external circumference of the third planetary gear set.

The first, second, and third planetary gear sets may be disposed on the input shaft in an order of second, first, and third planetary gear sets from an engine side.

The seventh shaft may be gear-meshed with the fourth shaft, and the ninth shaft may be selectively connectable with the transmission housing.

The planetary gear train may further include a first transfer gear disposed between the fourth shaft and the seventh shaft, and a second transfer gear disposed between the fifth shaft and the eighth shaft.

The planetary gear train may further include a first clutch disposed between the second transfer gear and the eighth shaft, a second clutch disposed between the input shaft and the second shaft, a third clutch disposed between the second shaft and the fourth shaft, a first brake disposed between the second shaft and the transmission housing, a second brake disposed between the sixth shaft and the transmission housing, and a third brake disposed between the ninth shaft and the transmission housing.

The planetary gear train may further include a first clutch disposed between the second transfer gear and the fifth shaft, a second clutch disposed between the input shaft and the second shaft, a third clutch disposed between the second shaft and the fourth shaft, a first brake disposed between the second shaft and the transmission housing, a second brake disposed between the sixth shaft and the transmission housing, and a third brake disposed between the ninth shaft and the transmission housing.

The seventh shaft may be selectively connectable with the transmission housing, and the ninth shaft may be gear-meshed with the fourth shaft.

The planetary gear train may further include a first transfer gear disposed between the fourth shaft and the ninth shaft, and a second transfer gear disposed between the fifth shaft and the eighth shaft.

The planetary gear train may further include a first clutch disposed between the second transfer gear and the fifth shaft, a second clutch disposed between the input shaft and the second shaft, a third clutch disposed between the second shaft and the fourth shaft, a first brake disposed between the second shaft and the transmission housing, a second brake disposed between the sixth shaft and the transmission housing, and a third brake disposed between the seventh shaft and the transmission housing.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, an input shaft mounted with the first, second, and third planetary gear sets at an external circumference of the input shaft, and an output shaft disposed in parallel with the input shaft and mounted with the fourth planetary gear set on an external circumference of the output shaft, in which the first rotation element and the fifth rotation element may be directly connected with the input shaft, the second rotation element may be selectively connectable with at least one of the input shaft and a transmission housing, the third rotation element may be directly connected with the eighth rotation element, the fourth rotation element may be directly connected with the ninth rotation element, selectively connectable with the second rotation element, and gear-meshed with one rotation element among the tenth and twelfth rotation elements, the sixth rotation element may be selectively gear-meshed with the eleventh rotation element which may be directly connected with the output shaft, the seventh rotation element may be selectively connectable with the transmission housing, and a remaining rotation element among the tenth and twelfth rotation elements that is not gear-meshed with the fourth rotation element may be selectively connectable with the transmission housing.

The fourth rotation element may be gear-meshed with the tenth rotation element through the first transfer gear, and the twelfth rotation element may be selectively connectable with the transmission housing.

The planetary gear train may further include a first clutch selectively connecting the second transfer gear and the eleventh rotation element, a second clutch selectively connecting the second rotation element and the input shaft, a third clutch selectively connecting the second rotation element and the fourth rotation element, a first brake selectively connecting the second rotation element to the transmission housing, a second brake selectively connecting the seventh rotation element to the transmission housing, and a third brake selectively connecting the twelfth rotation element to the transmission housing.

The planetary gear train may further include a first clutch selectively connecting the second transfer gear and the sixth rotation element, a second clutch selectively connecting the second rotation element and the input shaft, a third clutch selectively connecting the second rotation element and the fourth rotation element, a first brake selectively connecting the second rotation element to the transmission housing, a second brake selectively connecting the seventh rotation element to the transmission housing, and a third brake selectively connecting the twelfth rotation element to the transmission housing.

The fourth rotation element may be gear-meshed with the twelfth rotation element through the first transfer gear, and the tenth rotation element may be selectively connectable with the transmission housing.

The planetary gear train may further include a first clutch selectively connecting the second transfer gear and the sixth rotation element, a second clutch selectively connecting the second rotation element and the input shaft, a third clutch selectively connecting the second rotation element and the fourth rotation element, a first brake selectively connecting the second rotation element to the transmission housing, a second brake selectively connecting the seventh rotation element to the transmission housing, and a third brake selectively connecting the tenth rotation element to the transmission housing.

According to a planetary gear train of various embodiments of the present invention, planetary gear sets are dividedly arranged on input and output shafts disposed in parallel, thereby reducing a length and improving installability.

According to a planetary gear of various embodiments of the present invention, at least eight forward speeds and at least one reverse speed are realized by employing two transfer gears in addition to a combination of planetary gear sets, thereby providing a wide range of varying gear teeth so as to easily achieve optimum gear ratio and to easily comply with required performance for respective vehicles.

In addition, according to a planetary gear train of various embodiments of the present invention, a gear ratio span of more than 8.5 may be achieved while realizing at least nine forward speeds and at least one reverse speed, thereby maximizing an engine driving efficiency.

Furthermore, the linearity of step ratios of shift stages is secured while multi-staging the shift stages with high efficiency, thereby making it possible to improve drivability such as acceleration before and after a shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in the planetary gear train according to various embodiments of the present invention.

FIG. 9 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
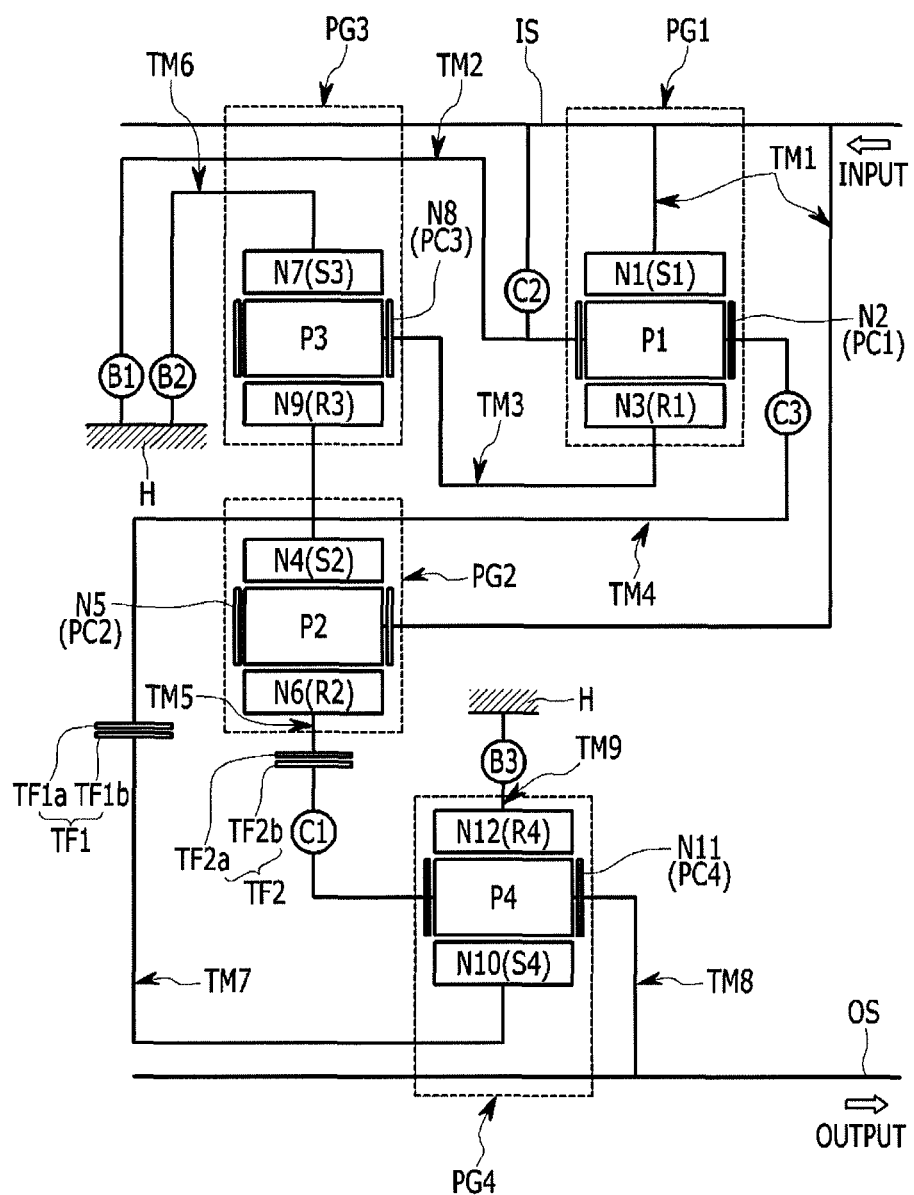
FIG. 1 is a schematic diagram of a planetary gear train according to various embodiments of the present invention.

FIG. 1 is a schematic diagram of a planetary gear train according to a first exemplary embodiment of the present invention.

Referring to FIG. 1, a planetary gear train according to a first exemplary embodiment of the present invention includes an input shaft IS, an output shaft OS, first, second, third, and fourth planetary gear sets PG1, PG2, PG3, and PG4, two transfer gears TF1 and TF2 and control elements of three clutches C1, C2, and C3 and three brakes B1, B2, and B3.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports third pinion P3 externally engaged with the third sun gear S3, and a third ring gear R3 that is internally engaged with the third pinion P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotation element N10, the fourth planet carrier PC4 acts as a eleventh rotation element N11, and the fourth ring gear R4 acts as a twelfth rotation element N12.

The first and third planetary gear set PG1 and PG3 are arranged on the input shaft IS in an order of the first planetary gear set PG1 and third planetary gear set PG3 from an engine side, and the second planetary gear set PG2 is arranged on an external circumference of the third planetary gear set PG3.

In the arrangement of the first, second, and third planetary gear sets PG1, PG2, and PG3, the first rotation element N1 is directly connected with the fifth rotation element N5, the third rotation element N3 is directly connected with the eighth rotation element N8, the fourth rotation element N4 is directly connected with the ninth rotation element N9, by six shafts TM1 to TM6.

Three shafts TM7 to TM9 are connected to the fourth planetary gear set PG4.

The nine shafts TM1 to TM9 are hereinafter described in detail

The first shaft TM1 interconnects the first rotation element N1 (first sun gear S1) and the fifth rotation element N5 (second planet carrier PC2), and is directly connected with the input shaft IS thereby continuously acting as an input element.

The second shaft TM2 is connected with the second rotation element N2 (first planet carrier PC1), and selectively connectable with the input shaft IS or selectively connectable with the transmission housing H, thereby selectively acting as an input element or selectively acting as a fixed element.

The third shaft TM3 interconnects the third rotation element N3 (first ring gear R1) and the eighth rotation element N8 (third planet carrier PC3).

The fourth shaft TM4 interconnects the fourth rotation element N4 (second sun gear S2) and the ninth rotation element N9 (third ring gear R3), and is selectively connectable with the second shaft TM2.

The fifth shaft TM5 is connected with sixth rotation element N6 (second ring gear R2).

The sixth shaft TM6 is connected with the seventh rotation element N7 (third sun gear S3), and selectively connectable with the transmission housing H, thereby selectively acting as a fixed element.

The seventh shaft TM7 is connected with the tenth rotation element N10 (fourth sun gear S4), and externally gear-meshed with the fourth shaft TM4.

The eighth shaft TM8 is connected with the eleventh rotation element N11 (fourth planet carrier PC4), directly connected with the output shaft OS thereby continuously acting as an output element, and selectively engaged with the fifth shaft TM5, externally.

The ninth shaft TM9 is connected with the twelfth rotation element N12 (fourth ring gear R4), and selectively connectable with the transmission housing H thereby selectively acting as a fixed element.

The two transfer gear TF1 and TF2 delivers a shifted torque of the main shifting portion having the first, second, and third planetary gear sets PG1, PG2, and PG3 to the auxiliary shifting portion having the fourth planetary gear set PG4, in a reverse rotation.

The first transfer gear TF1 includes a first transfer gear TF1a connected with the fourth shaft TM4 and a first transfer gear TF1b connected with the seventh shaft TM7, and externally gear-meshes the fourth shaft TM4 and the seventh shaft TM7.

The second transfer gear TF2 includes a second transfer gear TF2a connected with the fifth shaft TM5 and a second transfer gear TF2b connected with the eighth shaft TM8, and externally gear-meshes the fifth shaft TM5 and the eighth shaft TM8.

Respective shafts connected by the first and second transfer gears TF1 and TF2 rotate in opposite directions, and the gear ratios of the first and second transfer gears TF1 and TF2 may be preset in consideration of required speed ratio of the transmission.

The control elements include three clutches C1, C2, and C3 and three brakes B1, B2, and B3, and are arranged as follows.

The first clutch C1 is arranged between the second transfer gear TF2 and the eighth shaft TM8, such that the second transfer gear TF2 and the eighth shaft TM8 may selectively become integral.

The second clutch C2 is arranged between the input shaft IS and the second shaft TM2, such that the input shaft IS and the second shaft TM2 may selectively become integral.

The third clutch C3 is arranged between the second shaft TM2 and the fourth shaft TM4, such that the second shaft TM2 and the fourth shaft TM4 may selectively become integral.

The first brake B1 is arranged between the second shaft TM2 and the transmission housing H, such that the second shaft TM2 may selectively act as a fixed element.

The second brake B2 is arranged between the sixth shaft TM6 and the transmission housing H, such that the sixth shaft TM6 may selectively act as a fixed element.

The third brake B3 is arranged between the ninth shaft TM9 and the transmission housing H, such that the ninth shaft TM9 may selectively act as a fixed element.

The control elements of the first, second, and third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift-stages in a planetary gear train according to a first exemplary embodiment of the present invention.

Referring to FIG. 2, a planetary gear train according to an exemplary embodiment of the present invention realizes shifting by operating three control elements among the three clutches C1, C2, and C3 and the three brakes B1, B2, and B3.

[The Forward First Speed]

In the forward first speed shift-stage D1, the third clutch C3 and the second and third brakes B2 and B3 are operated.

As a result, the second shaft TM2 is connected with the fourth shaft TM4 by the operation of the third clutch. In this state, the torque of the input shaft IS is input to the first shaft TM1, and the sixth, ninth shaft TM6 and TM9 acts as a fixed element by the operation of the second, third brake B2 and B3, thereby realizing the forward first speed by cooperative operation of respective shafts and outputting a shifted torque to the output shaft OS connected with the eighth shaft TM8.

[The Forward Second Speed]

In the forward second speed shift-stage D2, the second and third clutches C2 and C3 and the third brake B3 are operated.

As a result, the second shaft TM2 is connected with the input shaft IS by the operation of the second clutch C2, and the second shaft TM2 is connected with the fourth shaft TM4 by the operation of the third clutch. In this state, the torque of the input shaft IS is input to the first, second shaft TM1 and TM2, and the ninth shaft TM9 acts as a fixed element by the operation of the third brake B3, thereby realizing the forward second speed by cooperative operation of respective shafts and outputting a shifted torque to the output shaft OS connected with the eighth shaft TM8.

[The Forward Third Speed]

In the forward third speed shift-stage D3, the second clutch C2 and the second and third brakes B2 and B3 are operated.

As a result, the second shaft TM2 is connected with the input shaft IS by the operation of the second clutch C2. In this state, the torque of the input shaft IS is input to the first, second shaft TM1 and TM2, and the sixth, ninth shaft TM6 and TM9 acts as a fixed element by the operation of the second, third brake B2 and B3, thereby realizing the forward third speed by cooperative operation of respective shafts and outputting a shifted torque to the output shaft OS connected with the eighth shaft TM8.

[The Forward Fourth Speed]

In the forward fourth speed shift-stage D4, the first clutch C1 and the second and third brakes B2 and B3 are operated.

As a result, the eighth shaft TM8 is connected with second transfer gear TF2 by the operation of the first clutch C1. In this state, the torque of the input shaft IS is input to the first shaft TM1, and the sixth, ninth shaft TM6 and TM9 acts as a fixed element by the operation of the second, third brake B2 and B3, thereby realizing the forward fourth speed by cooperative operation of respective shafts and outputting a shifted torque to the output shaft OS connected with the eighth shaft TM8.

[The Forward Fifth Speed]

In the forward fifth speed shift-stage D5, the first and second clutch C1 and C2 and the second brake B2 are operated.

As a result, the eighth shaft TM8 is connected with the second transfer gear TF2 by the operation of the first clutch C1, and the second shaft TM2 is connected with the input shaft IS by the operation of the second clutch C2. In this state, the torque of the input shaft IS is input to the first, second shaft TM1 and TM2, and the sixth shaft TM6 acts as a fixed element by the operation of the second brake B2, thereby realizing the forward fifth speed by cooperative operation of respective shafts and outputting a shifted torque to the output shaft OS connected with the eighth shaft TM8.

[The Forward Sixth Speed]

In the forward sixth speed shift-stage D6, the first, second, and third clutches C1, C2, and C3 are operated.

As a result, the eighth shaft TM8 is connected with the second transfer gear TF2 by the operation of the first clutch C1, the second shaft TM2 is connected with the input shaft IS by the operation of the second clutch C2, and the second shaft TM2 is connected with the fourth shaft TM4 by the operation of the third clutch. In this state, the torque of the input shaft IS is input to the first, second shaft TM1 and TM2, thereby realizing the forward sixth speed that outputs a torque as input, by cooperative operation of respective shafts and outputting a shifted torque to the output shaft OS connected with the eighth shaft TM8.

[The Forward Seventh Speed]

In the forward seventh speed shift-stage D7, the first and third clutches C1 and C3 and the second brake B2 are operated.

As a result, the eighth shaft TM8 is connected with the second transfer gear TF2 by the operation of the first clutch C1, and the second shaft TM2 is connected with the fourth shaft TM4 by the operation of the third clutch. In this state, the torque of the input shaft IS is input to the first shaft TM1, and the sixth shaft TM6 acts as a fixed element by the operation of the second brake B2, thereby realizing the forward seventh speed by cooperative operation of respective shafts and outputting a shifted torque to the output shaft OS connected with the eighth shaft TM8.

[The Forward Eighth Speed]

In the forward eighth speed shift-stage D8, the first and third clutches C1 and C3 and the first brake B1 are operated.

As a result, the eighth shaft TM8 is connected with the second transfer gear TF2 by the operation of the first clutch C1, and the second shaft TM2 is connected with the fourth shaft TM4 by the operation of the third clutch. In this state, the torque of the input shaft IS is input to the first shaft TM1, and the second shaft TM2 acts as a fixed element by the operation of the first brake B1, thereby realizing the forward eighth speed by cooperative operation of respective shafts and outputting a shifted torque to the output shaft OS connected with the eighth shaft TM8.

[The Forward Ninth Speed]

In the forward ninth speed shift-stage D9, the first clutch C1 and the first and second brakes B1 and B2 are operated.

As a result, the eighth shaft TM8 is connected with second transfer gear TF2 by the operation of the first clutch C1. In this state, the torque of the input shaft IS is input to the first shaft TM1, and the second, sixth shaft TM2 and TM6 acts as a fixed element by the operation of the first and second brakes B1 and B2, thereby realizing the forward ninth speed by cooperative operation of respective shafts and outputting a shifted torque to the output shaft OS connected with the eighth shaft TM8.

[The Reverse Speed]

In the reverse speed, first, second, third brake B1, B2, and B3 are operated.

As a result, the torque of the input shaft IS is input to the first shaft TM1, and the second, sixth, ninth shaft TM2, TM6, and TM9 acts as a fixed element by the operation of the first, second, third brake B1, B2, and B3, thereby realizing the reverse speed by cooperative operation of respective shafts and outputting a shifted torque to the output shaft OS connected with the eighth shaft TM8.

FIG. 2 shows gear ratios calculated under the condition that the gear ratio of the first ring gear R1/the first sun gear S1 is 1.85, the gear ratio of the second ring gear R2/the second sun gear S2 is 1.86, the gear ratio of the third ring gear R3/the third sun gear S3 is 2.42, the gear ratio of the fourth ring gear R4/the fourth sun gear S4 is 2.13, the gear ratio of the first transfer driven gear TF1$b$/the first transfer drive gear TF1$a$ is 0.95, and the gear ratio of the second transfer driven gear TF2$b$/the second transfer drive gear TF2$a$ is 1.05. However, the present invention is not limited to specific figures, since the FIGS. may be changed under the spirit of the present invention.

Figure 3:
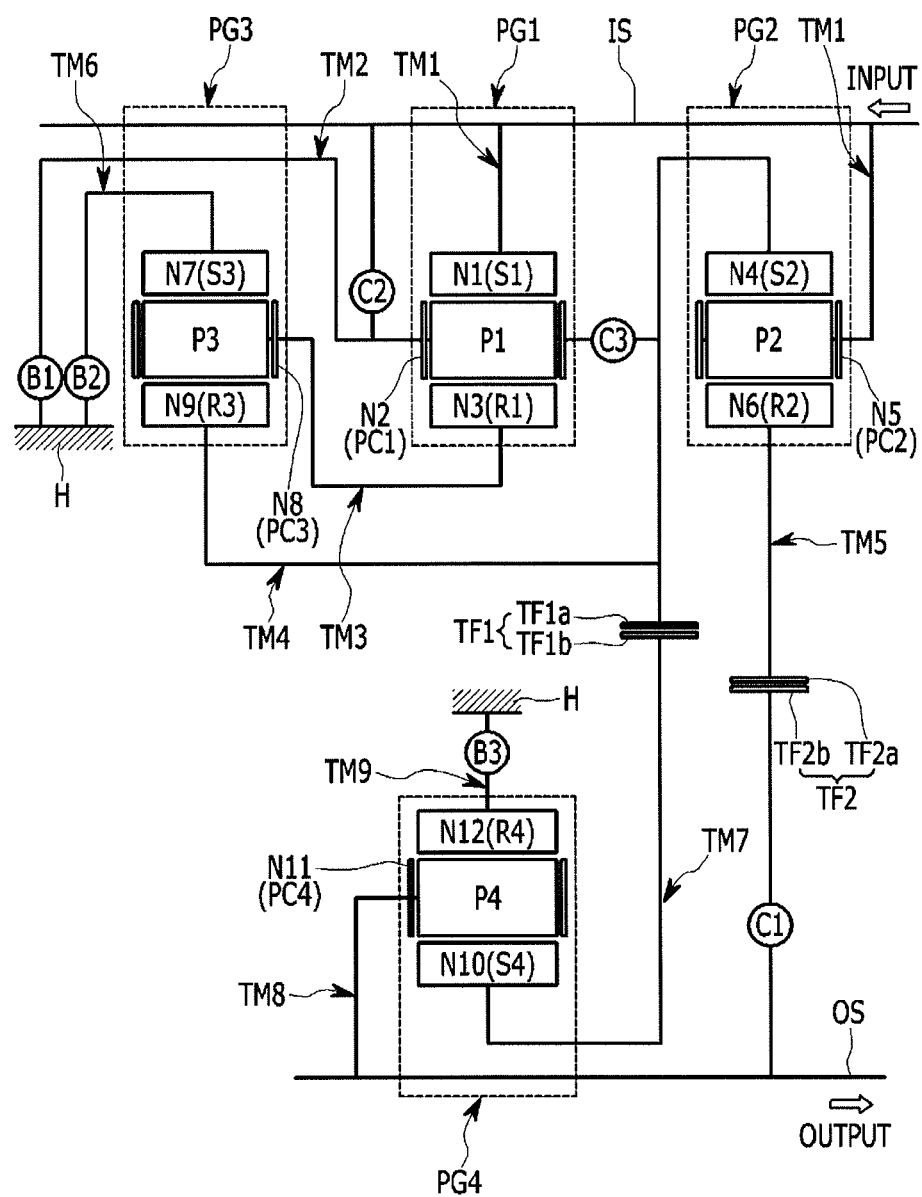
FIG. 3 is a schematic diagram of a planetary gear train according to various embodiments of the present invention.

FIG. 3 is a schematic diagram of a planetary gear train according to a second exemplary embodiment of the present invention.

In a planetary gear train according to a first exemplary embodiment of the present invention, the second planetary gear set PG2 is arranged on the external circumference of the third planetary gear set PG3, as shown in FIG. 1. However, referring to FIG. 3, the first, second, and third planetary gear sets PG1, PG2, and PG3 are arranged in an order of second, first, and third planetary gear set PG2, PG1, and PG3 from an engine side, according to the second exemplary embodiment.

Thus, the second exemplary embodiment differs from the first exemplary embodiment in locations of the first, second, and third planetary gear sets PG1, PG2, and PG3, but maintains a same shifting function and operation, which is therefore not described in further detail.

Figure 4:
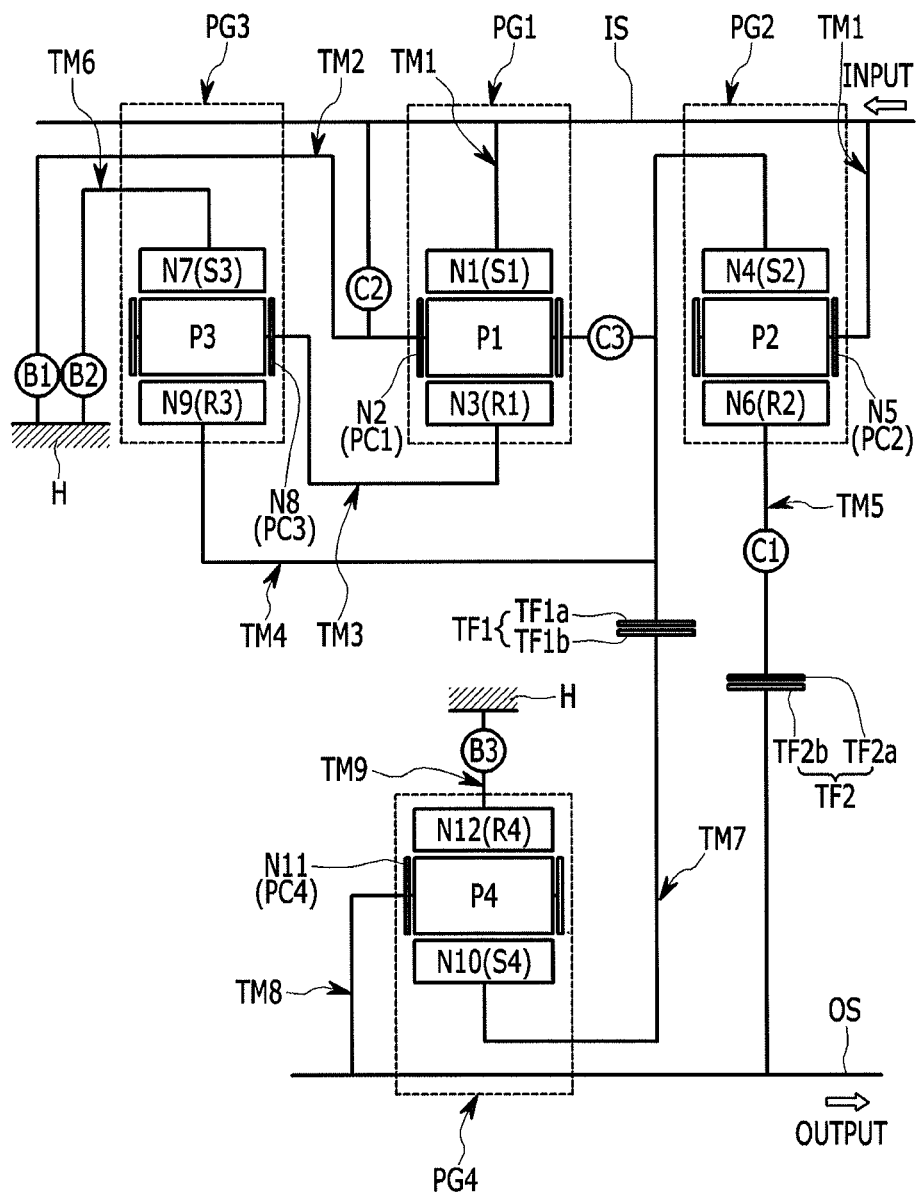
FIG. 4 is a schematic diagram of a planetary gear train according to various embodiments of the present invention.

FIG. 4 is a schematic diagram of a planetary gear train according to a third exemplary embodiment of the present invention.

In a planetary gear train according to first and second exemplary embodiments of the present invention, the first clutch C1 is arranged between the eighth shaft TM8 and the second transfer gear TF2, as shown in FIG. 1 and FIG. 3. However, referring to FIG. 4, the first clutch C1 is arranged between the second transfer gear TF2 and the fifth shaft TM5, according to a planetary gear train according to a third exemplary embodiment.

As a result, the third exemplary embodiment merely differs from the first, second exemplary embodiment in a location of the first clutch C1, but maintains a same function of selectively transmitting the torque of the fifth shaft TM5 to the eighth shaft TM8, which is therefore not described in further detail.

Figure 5:
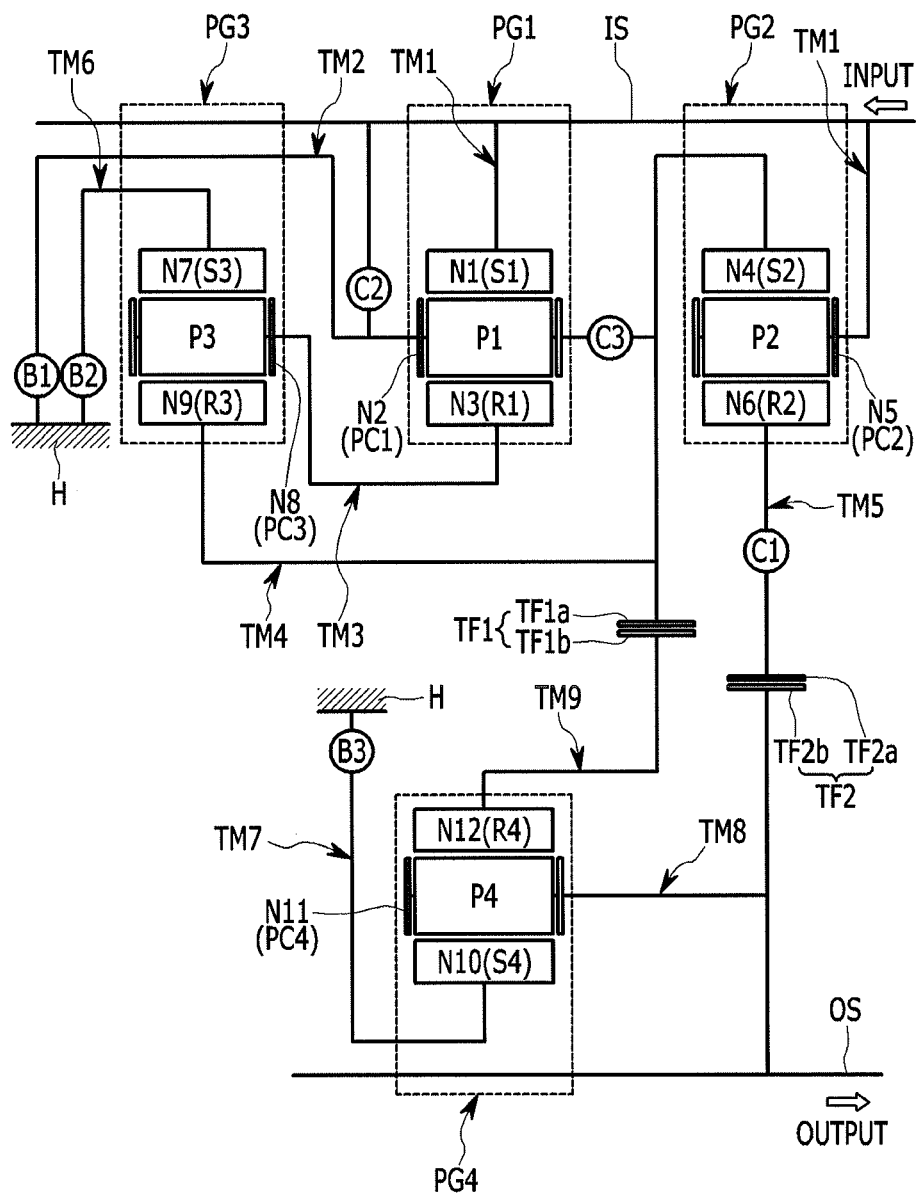
FIG. 5 is a schematic diagram of a planetary gear train according to various embodiments of the present invention.

FIG. 5 is a schematic diagram of a planetary gear train according to a fourth exemplary embodiment of the present invention.

In a planetary gear train according to the first, second, and third exemplary embodiment of the present invention, the fourth shaft TM4 is externally gear-meshed with the seventh shaft TM7 the first transfer gear TF1, and the ninth shaft TM9 is selectively connectable with the transmission housing H thereby selectively acting as a fixed element. However, referring to FIG. 5, the fourth shaft TM4 is externally gear-meshed with the ninth shaft TM9 through first transfer gear TF1, and the seventh shaft TM7 is selectively connectable with the transmission housing H thereby selectively acting as a fixed element, according to the fourth exemplary embodiment.

The fourth exemplary embodiment differs from the first, second, and third exemplary embodiment in that, in the auxiliary shifting portion, shafts externally gear-meshed with fourth shaft TM4 and selectively connectable with the transmission housing H are interchanged. However, it will be understood that a same shifting operation and function is maintained, which is therefore not described in further detail. Thus, the second exemplary embodiment differs from the first exemplary embodiment in locations of the first, second, and third planetary gear sets PG1, PG2, and PG3, but maintains a same shifting function and operation, which is therefore not described in further detail.

Figure 6:
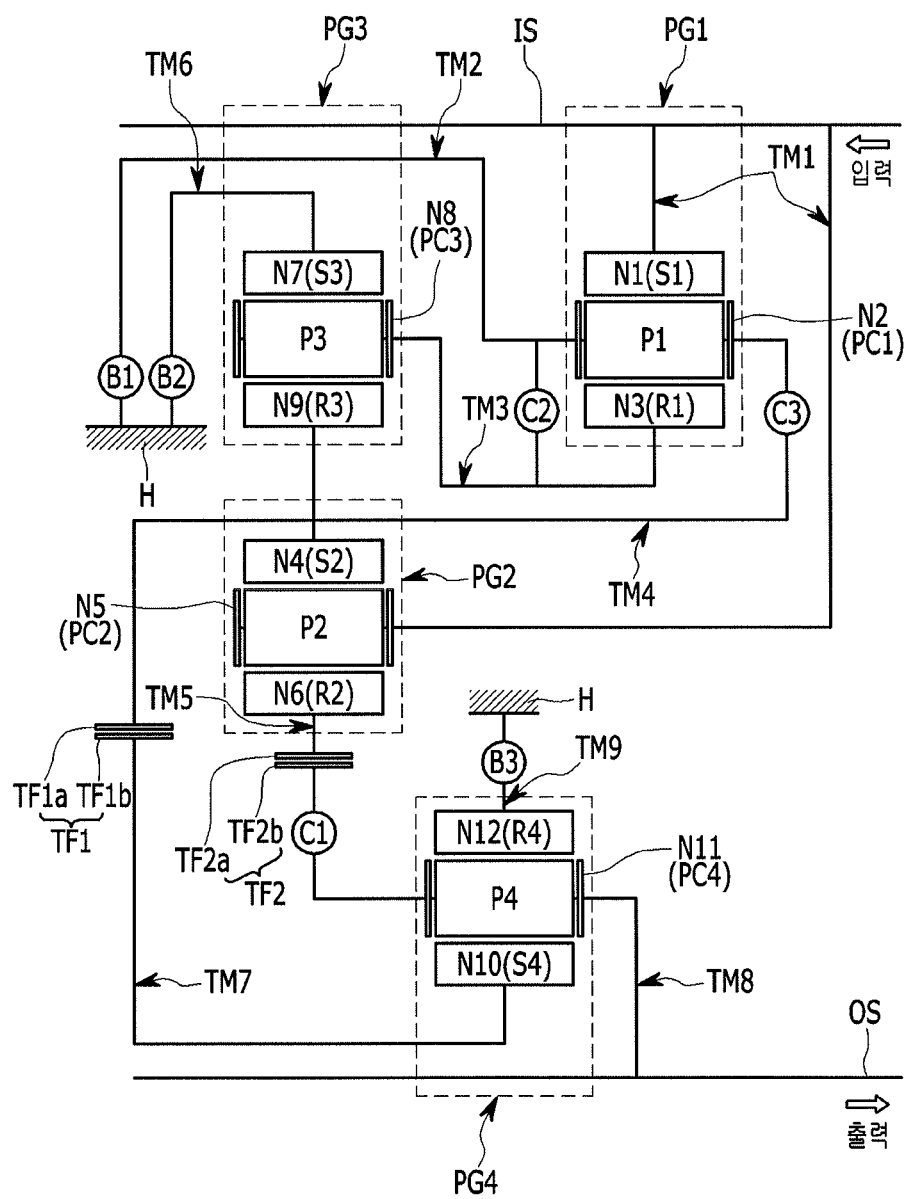
FIG. 6 is a schematic diagram of a planetary gear train according to various embodiments of the present invention.

FIG. 6 is a schematic diagram of a planetary gear train according to a fifth embodiment of the present invention.

As shown in FIG. 6, a planetary gear train according to a fifth embodiment of the present invention differs from the planetary gear train according to a first embodiment shown in FIG. 1 in that the second clutch C2 is disposed at a different position.

In more detail, according to the first embodiment, the second clutch is disposed between the input shaft IS and the second shaft TM2, while the input shaft IS is fixedly connected with the first rotation element N1, such that the first planetary gear set integrally rotates at a speed of the input shaft IS when the second clutch C2 is operated.

In comparison with such a first embodiment, the second clutch C2 is disposed between the second shaft TM2 and the third shaft TM3, while the first rotation element N1 is fixedly connected with the input shaft IS. By this scheme also, the first planetary gear set integrally rotates at a speed of the input shaft IS when the second clutch C2 is operated.

That is, planetary gear trains according to the first and fifth embodiments only differ in the position of the second clutch C2, and show the same shifting operation.

Figure 7:
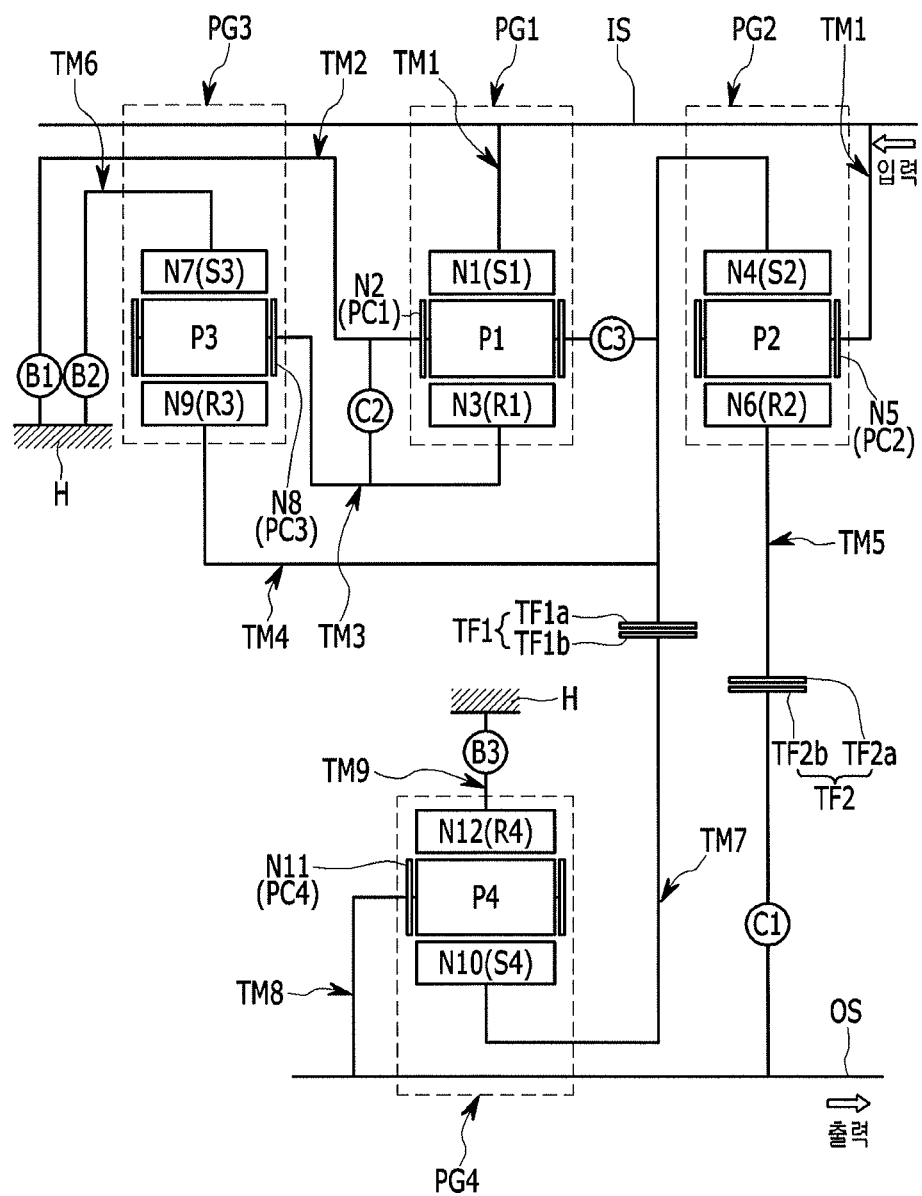
FIG. 7 is a schematic diagram of a planetary gear train according to various embodiments of the present invention.

FIG. 7 is a schematic diagram of a planetary gear train according to a sixth embodiment of the present invention.

As shown in FIG. 7, a planetary gear train according to a sixth embodiment of the present invention differs from the planetary gear train according to a second embodiment shown in FIG. 3 in that the second clutch C2 is disposed at a different position.

In more detail, according to the second embodiment, the second clutch is disposed between the input shaft IS and the second shaft TM2, while the input shaft IS is fixedly connected with the first rotation element N1, such that the first planetary gear set integrally rotates at a speed of the input shaft IS when the second clutch C2 is operated.

In comparison with such a second embodiment, the second clutch C2 is disposed between the second shaft TM2 and the third shaft TM3, while the first rotation element N1 is fixedly connected with the input shaft IS. By this scheme also, the first planetary gear set integrally rotates at a speed of the input shaft IS when the second clutch C2 is operated.

That is, planetary gear trains according to the second and sixth embodiments only differ in the position of the second clutch C2, and show the same shifting operation.

Figure 8:
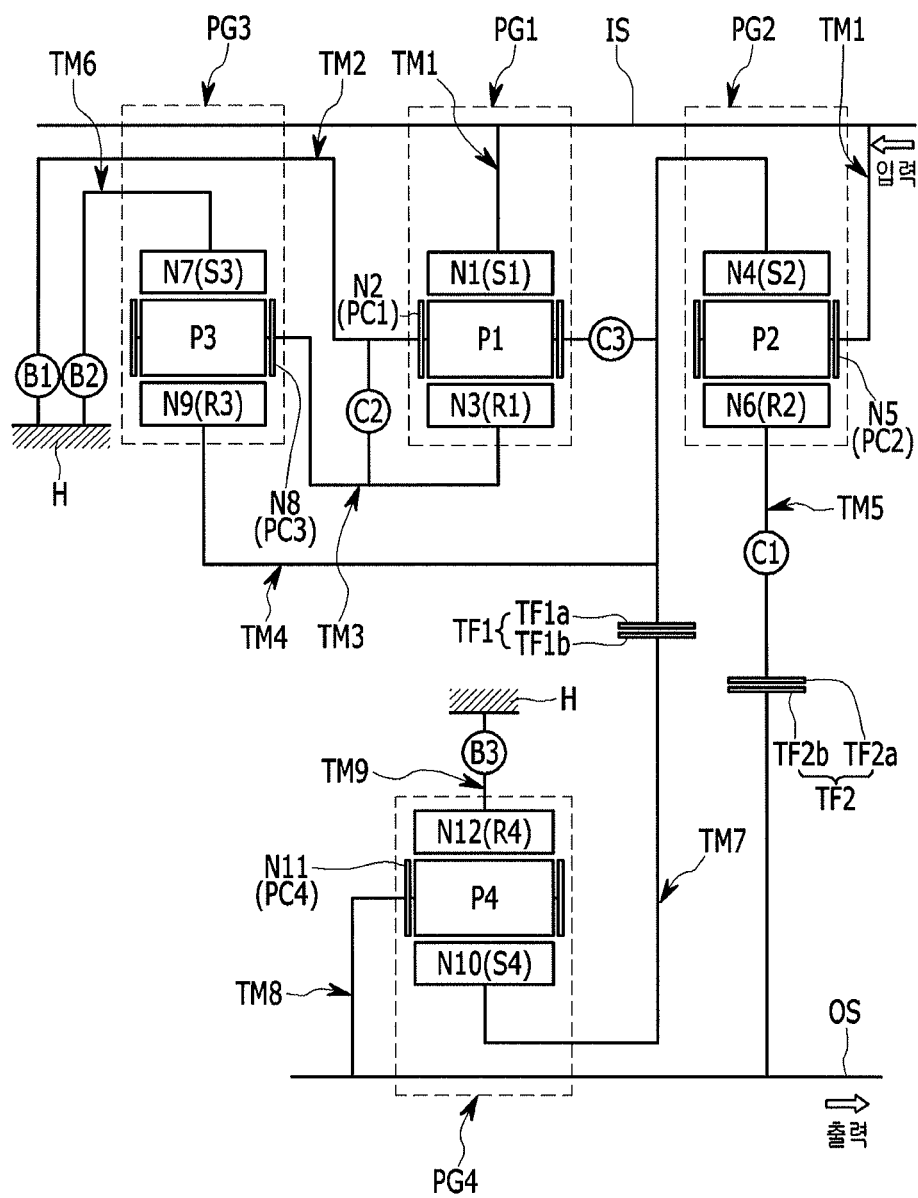
FIG. 8 is a schematic diagram of a planetary gear train according to various embodiments of the present invention.

FIG. 8 is a schematic diagram of a planetary gear train according to a seventh embodiment of the present invention.

As shown in FIG. 8, a planetary gear train according to a seventh embodiment of the present invention differs from the planetary gear train according to a third embodiment shown in FIG. 4 in that the second clutch C2 is disposed at a different position.

In more detail, according to the third embodiment, the second clutch is disposed between the input shaft IS and the second shaft TM2, while the input shaft IS is fixedly connected with the first rotation element N1, such that the first planetary gear set integrally rotates at a speed of the input shaft IS when the second clutch C2 is operated.

In comparison with such a third embodiment, the second clutch C2 is disposed between the second shaft TM2 and the third shaft TM3, while the first rotation element N1 is fixedly connected with the input shaft IS. By this scheme also, the first planetary gear set integrally rotates at a speed of the input shaft IS when the second clutch C2 is operated.

That is, planetary gear trains according to the third and seventh embodiments only differ in the position of the second clutch C2, and show the same shifting operation.

FIG. 9 is a schematic diagram of a planetary gear train according to an eighth embodiment of the present invention.

As shown in FIG. 9, a planetary gear train according to an eighth embodiment of the present invention differs from the planetary gear train according to a fourth embodiment shown in FIG. 5 in that the second clutch C2 is disposed at a different position.

In more detail, according to the fourth embodiment, the second clutch is disposed between the input shaft IS and the second shaft TM2, while the input shaft IS is fixedly connected with the first rotation element N1, such that the first planetary gear set integrally rotates at a speed of the input shaft IS when the second clutch C2 is operated.

In comparison with such a fourth embodiment, the second clutch C2 is disposed between the second shaft TM2 and the third shaft TM3, while the first rotation element N1 is fixedly connected with the input shaft IS. By this scheme also, the first planetary gear set integrally rotates at a speed of the input shaft IS when the second clutch C2 is operated.

That is, planetary gear trains according to the fourth and eighth embodiments only differ in the position of the second clutch C2, and show the same shifting operation.

As described above, according to a planetary gear train of various embodiments of the present invention, at least nine forward speeds and at least one reverse speed are realized by a combination of four planetary gear sets, two transfer gears, and six control elements, thereby providing improvement of power delivery performance and fuel consumption and improving installability by shortening the length of an automatic transmission.

In addition, according to a planetary gear train according of various embodiments of the present invention, two transfer gears which are external gears arranged on the output shaft OS are employed in addition to three planetary gear sets, and thus, gear teeth are widely varied so as to easily achieve optimum gear ratio and to easily comply with required performance for respective vehicles.

Furthermore, according to a planetary gear train of various embodiments of the present invention, a gear ratio span of more than 8.5 is achieved while realizing at least nine forward speeds and at least one reverse speed, thereby maximizing an engine driving efficiency.

Additionally, the linearity of step ratios of shift stages is secured while multi-staging the shift stages with high efficiency, thereby making it possible to improve drivability such as acceleration before and after a shift, an engine speed rhythmic sense, and the like.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element;
   an input shaft mounted with the first, second, and third planetary gear sets at an external circumference of the input shaft;
   an output shaft disposed in parallel with the input shaft and mounted with the fourth planetary gear set on an external circumference of the output shaft;
   a first shaft connecting the first rotation element and the fifth rotation element and directly connected with the input shaft;
   a second shaft connected with the second rotation element;
   a third shaft interconnecting the third rotation element and the eighth rotation element;
   a fourth shaft interconnecting the fourth rotation element and the ninth rotation element;
   a fifth shaft connected with the sixth rotation element;
   a sixth shaft connected with the seventh rotation element;
   a seventh shaft connected with the tenth rotation element;
   an eighth shaft connected with the eleventh rotation element, directly connected with the output shaft, and selectively gear-meshed with the fifth shaft; and
   a ninth shaft connected with the twelfth rotation element.

2. The planetary gear train of claim 1, wherein
   the second shaft is selectively connectable with at least one of the input shaft and a transmission housing;
   the fourth shaft is selectively connectable with the second shaft; and
   the sixth shaft is selectively connectable with the transmission housing.

3. The planetary gear train of claim 2, wherein
   the seventh shaft is gear-meshed with the fourth shaft; and
   the ninth shaft is selectively connectable with the transmission housing.

4. The planetary gear train of claim 3, further comprising:
   a first transfer gear disposed between the fourth shaft and the seventh shaft; and
   a second transfer gear disposed between the fifth shaft and the eighth shaft.

5. The planetary gear train of claim 4, further comprising:
   a first clutch disposed between the second transfer gear and the eighth shaft;
   a second clutch disposed between the input shaft and the second shaft;
   a third clutch disposed between the second shaft and the fourth shaft;
   a first brake disposed between the second shaft and the transmission housing;
   a second brake disposed between the sixth shaft and the transmission housing; and
   a third brake disposed between the ninth shaft and the transmission housing.

6. The planetary gear train of claim 4, further comprising:
   a first clutch disposed between the second transfer gear and the fifth shaft;
   a second clutch disposed between the input shaft and the second shaft;
   a third clutch disposed between the second shaft and the fourth shaft;
   a first brake disposed between the second shaft and the transmission housing;
   a second brake disposed between the sixth shaft and the transmission housing; and
   a third brake disposed between the ninth shaft and the transmission housing.

7. The planetary gear train of claim 4, further comprising:
   a first clutch disposed between the second transfer gear and the eighth shaft;
   a second clutch disposed between the second shaft and the third shaft;
   a third clutch disposed between the second shaft and the fourth shaft;
   a first brake disposed between the second shaft and the transmission housing;
   a second brake disposed between the sixth shaft and the transmission housing; and
   a third brake disposed between the ninth shaft and the transmission housing.

8. The planetary gear train of claim 4, further comprising:
   a first clutch disposed between the second transfer gear and the fifth shaft;
   a second clutch disposed between the second shaft and the third shaft;
   a third clutch disposed between the second shaft and the fourth shaft;
   a first brake disposed between the second shaft and the transmission housing;
   a second brake disposed between the sixth shaft and the transmission housing; and a third brake disposed between the ninth shaft and the transmission housing.

9. The planetary gear train of claim 2, wherein
the seventh shaft is selectively connectable with the transmission housing; and
the ninth shaft is gear-meshed with the fourth shaft.

10. The planetary gear train of claim 9, further comprising:
a first transfer gear disposed between the fourth shaft and the ninth shaft; and
a second transfer gear disposed between the fifth shaft and the eighth shaft.

11. The planetary gear train of claim 10, further comprising:
a first clutch disposed between the second transfer gear and the fifth shaft;
a second clutch disposed between the input shaft and the second shaft;
a third clutch disposed between the second shaft and the fourth shaft;
a first brake disposed between the second shaft and the transmission housing;
a second brake disposed between the sixth shaft and the transmission housing; and
a third brake disposed between the seventh shaft and the transmission housing.

12. The planetary gear train of claim 10, further comprising:
a first clutch disposed between the second transfer gear and the fifth shaft;
a second clutch disposed between the second shaft and the third shaft;
a third clutch disposed between the second shaft and the fourth shaft;
a first brake disposed between the second shaft and the transmission housing;
a second brake disposed between the sixth shaft and the transmission housing; and
a third brake disposed between the seventh shaft and the transmission housing.

13. The planetary gear train of claim 1, wherein
the first planetary gear set comprises a first sun gear as the first rotation element, a first planet carrier as the second rotation element, and a first ring gear as the third rotation element;
the second planetary gear set comprises a second sun gear as the fourth rotation element, a second planet carrier as the fifth rotation element, and a second ring gear as the sixth rotation element;
the third planetary gear set comprises a third sun gear as the seventh rotation element, a third planet carrier as the eighth rotation element, and a third ring gear as the ninth rotation element; and
the fourth planetary gear set comprises a fourth sun gear as the tenth rotation element, a fourth planet carrier as the eleventh rotation element, and a fourth ring gear as the twelfth rotation element.

14. The planetary gear train of claim 1, wherein the first, second, and third planetary gear sets are disposed on the input shaft in an order of first and third planetary gear sets from an engine side, and the second planetary gear set is disposed on an external circumference of the third planetary gear set.

15. The planetary gear train of claim 1, wherein the first, second, and third planetary gear sets are disposed on the input shaft in an order of second, first, and third planetary gear sets from an engine side.

16. A planetary gear train of an automatic transmission for a vehicle, comprising:
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
an input shaft mounted with the first, second, and third planetary gear sets at an external circumference of the input shaft; and
an output shaft disposed in parallel with the input shaft and mounted with the fourth planetary gear set on an external circumference of the output shaft,
wherein the first rotation element and the fifth rotation element are directly connected with the input shaft,
the second rotation element is selectively connectable with at least one of the input shaft and a transmission housing,
the third rotation element is directly connected with the eighth rotation element,
the fourth rotation element is directly connected with the ninth rotation element, selectively connectable with the second rotation element, and gear-meshed with one rotation element among the tenth and twelfth rotation elements,
the sixth rotation element is selectively gear-meshed with the eleventh rotation element which is directly connected with the output shaft,
the seventh rotation element is selectively connectable with the transmission housing, and
a remaining rotation element among the tenth and twelfth rotation elements that is not gear-meshed with the fourth rotation element is selectively connectable with the transmission housing.

17. The planetary gear train of claim 16, wherein
the first planetary gear set comprises a first sun gear as the first rotation element, a first planet carrier as the second rotation element, and a first ring gear as the third rotation element;
the second planetary gear set comprises a second sun gear as the fourth rotation element, a second planet carrier as the fifth rotation element, and a second ring gear as the sixth rotation element;
the third planetary gear set comprises a third sun gear as the seventh rotation element, a third planet carrier as the eighth rotation element, and a third ring gear as the ninth rotation element; and
the fourth planetary gear set comprises a fourth sun gear as the tenth rotation element, a fourth planet carrier as the eleventh rotation element, and a fourth ring gear as the twelfth rotation element.

18. The planetary gear train of claim 16, wherein the fourth rotation element is gear-meshed with the tenth rotation element through the first transfer gear, and the twelfth rotation element is selectively connectable with the transmission housing.

19. The planetary gear train of claim 18, further comprising:
a first clutch selectively connecting the second transfer gear and the eleventh rotation element;

a second clutch selectively connecting the second rotation element and the input shaft;
a third clutch selectively connecting the second rotation element and the fourth rotation element;
a first brake selectively connecting the second rotation element to the transmission housing;
a second brake selectively connecting the seventh rotation element to the transmission housing; and
a third brake selectively connecting the twelfth rotation element to the transmission housing.

20. The planetary gear train of claim 18, further comprising:
a first clutch selectively connecting the second transfer gear and the sixth rotation element;
a second clutch selectively connecting the second rotation element and the input shaft;
a third clutch selectively connecting the second rotation element and the fourth rotation element;
a first brake selectively connecting the second rotation element to the transmission housing;
a second brake selectively connecting the seventh rotation element to the transmission housing; and
a third brake selectively connecting the twelfth rotation element to the transmission housing.

21. The planetary gear train of claim 18, further comprising:
a first clutch selectively connecting the second transfer gear and the eleventh rotation element;
a second clutch selectively connecting the second rotation element and the third rotation element;
a third clutch selectively connecting the second rotation element and the fourth rotation element;
a first brake selectively connecting the second rotation element to the transmission housing;
a second brake selectively connecting the seventh rotation element to the transmission housing; and
a third brake selectively connecting the twelfth rotation element to the transmission housing.

22. The planetary gear train of claim 18, further comprising:
a first clutch selectively connecting the second transfer gear and the sixth rotation element;
a second clutch selectively connecting the second rotation element and the third rotation element;
a third clutch selectively connecting the second rotation element and the fourth rotation element;
a first brake selectively connecting the second rotation element to the transmission housing;
a second brake selectively connecting the seventh rotation element to the transmission housing; and
a third brake selectively connecting the twelfth rotation element to the transmission housing.

23. The planetary gear train of claim 16, wherein the fourth rotation element is gear-meshed with the twelfth rotation element through the first transfer gear, and the tenth rotation element is selectively connectable with the transmission housing.

24. The planetary gear train of claim 23, further comprising:
a first clutch selectively connecting the second transfer gear and the sixth rotation element;
a second clutch selectively connecting the second rotation element and the input shaft;
a third clutch selectively connecting the second rotation element and the fourth rotation element;
a first brake selectively connecting the second rotation element to the transmission housing;
a second brake selectively connecting the seventh rotation element to the transmission housing; and
a third brake selectively connecting the tenth rotation element to the transmission housing.

25. The planetary gear train of claim 23, further comprising:
a first clutch selectively connecting the second transfer gear and the sixth rotation element;
a second clutch selectively connecting the second rotation element and the third rotation element;
a third clutch selectively connecting the second rotation element and the fourth rotation element;
a first brake selectively connecting the second rotation element to the transmission housing;
a second brake selectively connecting the seventh rotation element to the transmission housing; and
a third brake selectively connecting the tenth rotation element to the transmission housing.

* * * * *